Jan. 10, 1939.    G. GILLES ET AL    2,143,597
LIQUID LEVEL INDICATOR
Filed Dec. 2, 1935
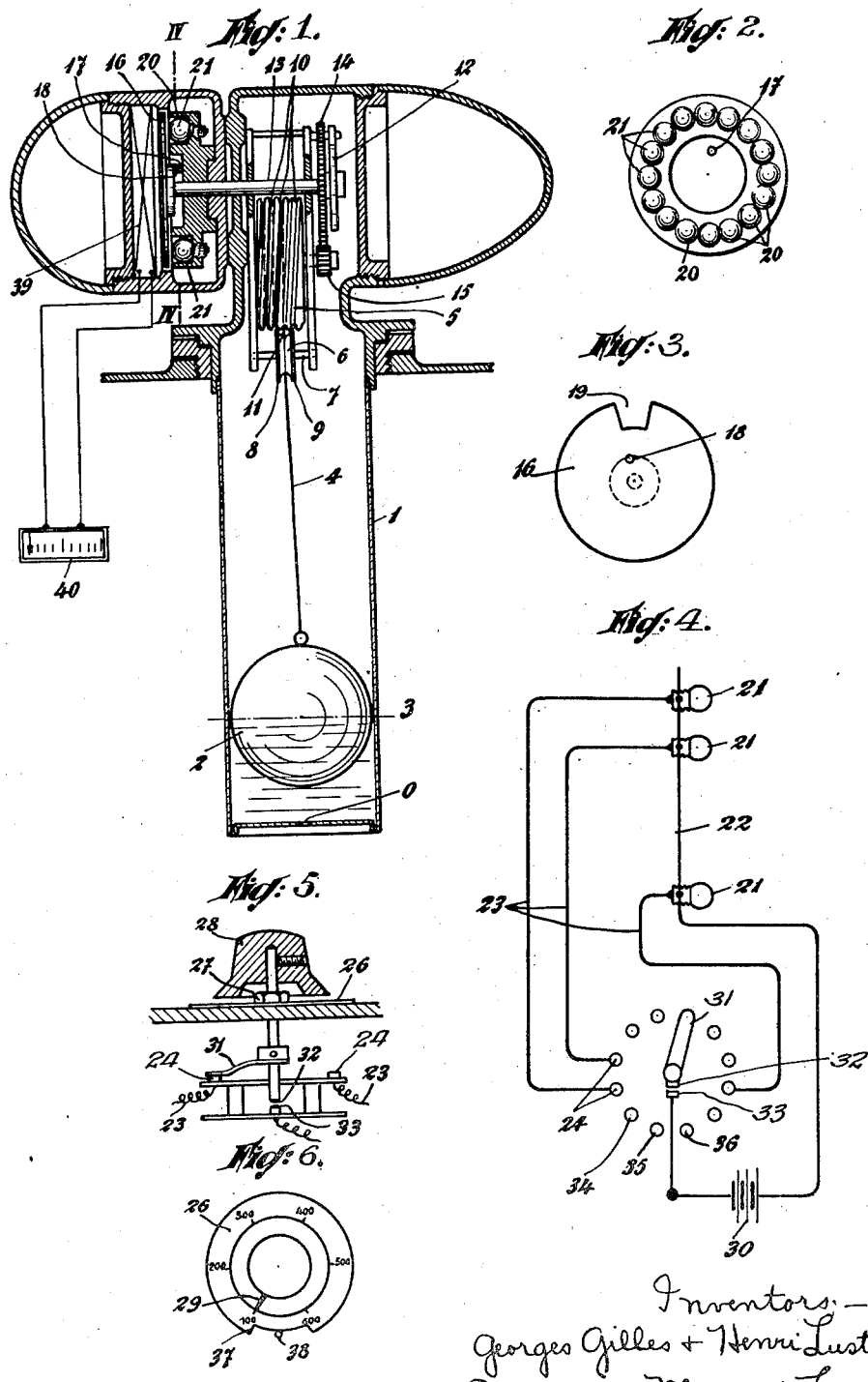

Patented Jan. 10, 1939

2,143,597

UNITED STATES PATENT OFFICE 2,143,597

LIQUID LEVEL INDICATOR

Georges Gilles, Paris, and Henri Lustin, Melun, France

Application December 2, 1935, Serial No. 52,600
In France December 3, 1934

6 Claims. (Cl. 177—351).

The present invention relates to liquid level indicators.

The object of the present invention is to provide an indicator of this kind which is both safe and reliable.

The essential feature of the present invention consists in the provision of a photo-electric cell which is located close to a plurality of electric lamps each of which is adapted to act on said cell. Between this cell and said lamps there is provided means, such for instance as a rotatable disc having a notch formed therein, for allowing only one of said lamps at a time to act on said cell. This disc is operative by means responsive to the position of the liquid level. The lamps are adapted to be illuminated separately and successively, and detecting means are provided for indicating the energizing of the photo-electric cell when the lamp corresponding to the actual position of said disc is illuminated.

Preferred embodiments of the present invention will be hereinafter described with reference to the accompanying drawings, given merely by way of example, and in which:

Fig. 1 is a vertical sectional view of an embodiment of the apparatus according to the present invention;

Fig. 2 is a front view of a detail of the apparatus of Fig. 1;

Fig. 3 shows a rotary screen for use in connection with the apparatus of Fig. 1, seen from the back;

Fig. 4 is a diagram of the electrical connections of the apparatus of Fig. 1;

Fig. 5 is a sectional view of the operating knob of the apparatus;

Fig. 6 is a front view of this knob and of the dial which is associated therewith.

The apparatus illustrated by the drawings is adapted to indicate the level of a liquid in a tank. It includes a tube 1 located in the tank and communicating with the tank through a small orifice O, so as to render the liquid level practically stable in spite of the shocks to which the apparatus is subjected due to its being mounted on a vehicle. However, the section of this orifice O is sufficient in order that the slow drop of the mean level may be indicated accurately.

On the inside of tube 1 there is provided a float 2, which moves together with the level 3 to be indicated and a pulley 5 around which passes a cable 4 secured to said float 2. This pulley maintains a suitable tension of cable 4.

In front of this pulley 5 there is provided a small guiding pulley 6, which is mounted loose on a shaft 7. The cheeks 8 and 9 of pulley 6 are engaged in the helical groove 10 cut in pulley 5.

In this way, the guiding pulley 6 and the winding pulley 5 wholly surround cable 4 at the place 11 where it enters the helical groove 10 of pulley 5, which ensures a safe and efficient guiding.

Pulley 5 is urged to turn in the direction corresponding to an upward displacement of the float by a spiral spring 12 acting on shaft 13 and, through the medium of a gear wheel 14, meshing with gear wheel 15 rigid with said pulley 5.

Wheel 14 is rigid with a circular screen 16 carried by shaft 13, on which it is fixed. The ratio of the diameters of wheels 14 and 15 is such that screen 16 always turns through a complete circle when the level 3 of the liquid passes from the higher point to the lowest point.

A fixed stop 17 and a finger 18 carried by screen 16 prevent the latter from turning too much, whereby the same lamp 21 cannot be uncovered for two extreme positions of the level.

Screens 16, provided with a notch 19, the width of which corresponds to the interval between one lamp 21 and the next one, moves in front of a series of holes or chambers 20 each of which contains a lamp 21, the illumination of which can be controlled separately. For this purpose all the caps of the lamps 21 above mentioned are connected to a common wire 22 (Fig. 4) but each of the central terminals of said lamps is connected to a particular wire 23 leading to the corresponding contact plug of a circular contactor the movable lever of which is shown at 31, whereby the order of the successive lamps 21 is the same as the order of the successive contact studs 24 connected with said lamps 21, respectively.

The contactor 25 is provided with a dial 26 (Fig. 5). The angular position of this dial can be adjusted in such manner as to compensate for the small intervals that would eventually result from variations in the length of cable 4. For this purpose, nut 27 would be loosened and subsequently tightened, once the adjustment of dial 26 has been performed.

This dial 26 is graduated in such manner as to indicate directly the volumes corresponding to the respective levels.

The operating knob 28 is provided with an index 29 adapted to move in front of dial 26. Furthermore, in order to avoid a useless consumption of current, from source 30 (Fig. 4), the operating knob 28 is moved toward the rear by resilient lever 31. It follows that said lever 31 no longer receives current from the source and that, on the contrary, that this lever is fed with current when knob 28 is depressed, through the contact that is made between 32 and 33.

The contactor is provided with several rest studs 34, 35 and 36 and the dial 26 (Figs. 5 and 6), owing to this feature, cannot be placed in such position that a maximum level of the liquid would be read instead of the actual minimum level.

For this purpose, the dial 26 is provided with a notch 37 (Fig. 6) and stop 38 prevents it from moving beyond the positions beyond which there might be a confusion between the uppermost and lowermost level.

Opposite the lamps, and beyond the screen, there is mounted a photo-electric cell 39 which is connected with a current indicating apparatus 40 visible to the person who is to read the level of the liquid. The deviation of the needle of this apparatus 40 indicates that index 29 is in the position that corresponds to the actual level of liquid in the tank. It then suffices to read on dial 26 the amount of liquid remaining in the tank.

The chief advantage of the arrangement above described is that the length of the path of the light rays between the photo-electric cell and the source by which said cell is energized remains unchanged whatever be the variations of the level.

Furthermore, as the only action of the photo-electric cell is to operate a detecting apparatus or indicator, such as 40, variations in the state of said photo-electric cell have no detrimental effect on the working of the apparatus.

This apparatus has further advantages, among which the following may be cited:

(a) It gives indications which are not influenced by rapid oscillations of the level;

(b) The consumption of electric current is reduced to a minimum owing to the provision of knob 28, which automatically switches off the current; and (c) The adjustment of the apparatus when brought into service is facilitated.

In a general manner, while we have, in the above description, disclosed what we deem to be a practical and efficient embodiment of the present invention, it should be well understood that we do not wish to be limited thereto as there might be changes made in the arrangement, disposition and form of the parts without departing from the principle of the present invention as comprehended within the scope of the appended claims.

What we claim is:

1. An apparatus for indicating a positional factor which comprises means for generating electrical energy in response to light incident thereon; light emitting means for energizing the first means, adapted to project light from spaced apart points in front of the light sensitive means; light screening means including a light permeable zone operatively interposed between the first and second means for cutting off any light from the second means to the first means except through its light permeable zone, the light screening means being relatively movable with respect to the first and second means in response to said positional factor; selecting means operatively connected with the light emitting means for varying the point from which light is projected; and an electrically actuated indicator operatively coupled with the light sensitive means.

2. In an apparatus for indicating a positional factor the combination of a light impervious screen including a light permeable zone, movable along a predetermined path; means for moving the screen along said path in response to said positional factor, means for projecting light on said screen from points distributed along a second path substantially parallel with the first path; light sensitive means for generating electrical energy, positioned beyond the screen with respect to the light projecting means, operative when light is projected from a point in register with the light permeable zone in the screen; means operatively coupled with the light projecting means, for selecting the point on the second path from which light is projected; and an electrically actuated registration indicator operatively connected to the light sensitive means.

3. An apparatus for indicating a positional factor which comprises means for generating electrical energy in response to light incident thereon; light emitting means for energizing the first means, adapted to project light from points spaced along a circle in front of the light sensitive means; light screening means including a light permeable zone operatively interposed between the first and second means for cutting off any light from the second means to the first means except through its light permeable zone, the light screening means being relatively revolvable, with respect to the first and second means in response to said positional factor, about an axis including the centre of said circle; selecting means operatively connected with the light emitting means for varying the point of said circle from which light is projected; and an electrically actuated indicator operatively coupled with the light sensitive means.

4. An apparatus for indicating a positional factor which comprises light sensitive means for generating electrical energy in response to light incident thereon; a plurality of light sources arranged along a predetermined path and adapted to project light in front of said light sensitive means, light screening means including a light permeable zone operatively interposed between said light sensitive means and said sources for cutting off any light from said sources to said light sensitive means except through its light permeable zone, the light screening means being relatively movable with respect to the light sensitive means and to the sources in such manner that its permeable zone moves along a second path substantially parallel with the first path, means for moving said screening means in response to said positional factor, selecting means operatively connected with the light sources for separately and successively bringing said sources into play; and an electrically actuated indicator operatively coupled with the light sensitive means.

5. An apparatus for indicating a positional factor which comprises a photo-electric cell for generating electrical energy in response to light incident thereon; a plurality of electric lamps arranged along a predetermined path and adapted to project light in front of said photo-electric cell, light screening means operatively interposed between said cell and said lamps and including a light permeable zone the width of which corresponds to the interval between two adjacent lamps, the light screening means being relatively movable with respect to the photo-electric cell and to the electric lamps in such manner that its permeable zone moves along a second path substantially parallel with the first path, means for moving said screening means in response to said positional factor, selecting means electrically connected with the electric lamps for separately and successively illuminating said lamps and an electrically actuated indicator operatively coupled with said photo-electric cell.

6. An apparatus for indicating a positional factor which comprises a photo-electric cell for generating electrical energy in response to light incident thereon; a plurality of electric lamps arranged along a circular row and each adapted to project light in front of said cell, light screening means operatively interposed between said cell and said lamps and revolvable about an axis which includes the center of said circular row, said screening means comprising a permeable part adapted to permit the light rays from the lamp in register with said part to reach said cell, means for moving said screening means in response to said positional factor, selecting means electrically connected with the lamps for separately and successively illuminating said lamps; and an electrically actuated indicator operatively coupled with the photo-electric cell.

GEORGES GILLES.
HENRI LUSTIN.